United States Patent [19]

Hussinger

[11] Patent Number: 5,516,430

[45] Date of Patent: May 14, 1996

[54] PLANARIZATION OF AIR BEARING SLIDER SURFACES FOR REACTIVE ION ETCHING OR ION MILLING

[75] Inventor: Keith R. Hussinger, San Carlos, Calif.

[73] Assignee: Read-Rite Corporation, Milpitas, Calif.

[21] Appl. No.: 410,774

[22] Filed: Mar. 27, 1995

[51] Int. Cl.⁶ .......................... C03C 27/00; C03C 25/06; H01L 21/306
[52] U.S. Cl. ........................ 216/36; 216/48; 216/52; 216/66; 216/38
[58] Field of Search .................. 216/33, 35, 41, 216/52, 66, 67, 48, 36, 38

[56] References Cited

U.S. PATENT DOCUMENTS 4,564,585  1/1986  Blaske et al. ................ 216/66 X
5,156,704  10/1992  Kemp ............................ 216/52

*Primary Examiner*—Donald R. Valentine
*Attorney, Agent, or Firm*—Nathan N. Kallman

[57] ABSTRACT

A process for reactive ion etching or ion milling of an air bearing slider comprises the steps of mechanical alignment of unetched slider rows with active transducer devices onto an alignment fixture; positioning a layer of thermally conductive adhesive between the rows and a substrate; heating the adhesive through the substrate such that the adhesive bonds the rows to the substrate while encapsulating the rows; removing the alignment fixture; patterning and etching the exposed planarized slider surfaces; stripping the resist and cutting the rows into individual sliders while still bonded to the substrate; stripping the adhesive with an organic solvent. This process increases tolerance to manufacturing variability, minimizes damage and contamination of the transducer devices, and decreases the cycle time and production costs.

3 Claims, 2 Drawing Sheets

5,516,430

PLANARIZATION OF AIR BEARING SLIDER SURFACES FOR REACTIVE ION ETCHING OR ION MILLING

FIELD OF THE INVENTION

This invention relates to the processing of air bearing sliders of magnetic head assemblies used in disk drives and in particular to the reactive ion etching or ion milling step of the air bearing etching operation.

BACKGROUND OF THE INVENTION

Magnetic head assemblies that fly relative to rotating magnetic disks are used extensively in disk drives for recording or reading data. Air bearing sliders used in these head assemblies typically have a leading edge and a trailing edge. One or more magnetic transducers are deposited at the trailing edge of the slider. Generally, the sliders have tapered portions at the leading edge and longitudinal rails that extend from the tapers all or part way to the trailing edge.

The processing methods used in fabricating air bearing sliders begin with conventional full-wafer processing techniques, which are used to form the magnetic transducing elements at the trailing edge of the slider. In order to implement the process which forms the air bearing slider structure, the full wafer must be sliced into rows to expose the cross-section of the wafer upon which the slider structure is to be formed. These rows are aligned and fixed onto a substrate, and then conventional patterning and etching techniques are used to form the slider rail structure. Both horizontal alignment of the rows and vertical alignment of the surfaces to be processed into sliders are critical, the latter for providing uniformity of etch depth.

Protecting the exposed vertical edge of the slider, where the transducer has been deposited, is critical during etching of the slider, which is normally accomplished using reactive ion etching (RIE) or ion milling techniques. Typically, when the vertical edges of the slider are protected by layers of photoresist during etching, tearing of the photoresist on the vertical edges often leaves the active devices exposed to the RIE plasma. One consequence is chemical redeposition on the active devices during etch. To minimize such effects, thick layers of negative resist must be used with all the inherent problems, such as poor critical dimension (CD) control, poor resolution and the like.

Cutting the rows into individual sliders after the air bearing etch presents further problems. If the rows must be debonded from the etch substrate and rebonded onto a second substrate before cutting, known as the partoff/rebonding operation, contamination due to handling and processing time are increased. Thus, an optimized process would eliminate the debonding entirely and permit the cutting of the individual sliders while the rows were still bonded to the etch substrate.

Desirable properties of an adhesive which bonds the rows to the etch substrate are: 1) it should cure completely and quickly; 2) It should have high thermal conductivity to minimize the rise in temperature of the devices during the air bearing etch; 3) it should be resistant at least in the short term to the photoresist stripper; and 4) it should leave no residue when removed from the rows of devices.

SUMMARY OF THE INVENTION

An object of this invention is to provide a process for reactive ion etching or ion milling of an air bearing slider which optimizes vertical alignment of the surfaces of the rows which are to be etched into sliders, yielding uniform etch depth.

Another object of the invention is to provide a process for reactive ion etching or ion milling of an air bearing slider which presents a planar surface for patterning, allowing use of thin resist layers and yielding improved CD control.

Another object is to provide a process for reactive ion etching or ion milling of an air bearing slider which encapsulates the rows during etch, thus eliminating redeposition contamination during etch and protecting the active transducer devices from handling damage.

A further object of the invention is to provide a process for reactive ion etching or ion milling of an air bearing slider which permits post-etch cutting of the individual sliders while the rows are still bonded to the substrate, thus eliminating partoff/rebonding operation.

A still further object of the invention is to provide an adhesive for reactive ion etching or ion milling of an air bearing slider which cures completely and quickly under processing conditions, which has high thermal conductivity, which strips completely without leaving residue or contamination, and which has at least short-term resistance to the photoresist stripper.

In a preferred embodiment of this invention, unetched rows of air bearing sliders are mechanically aligned against pins onto an alignment fixture. A layer of adhesive, comprising thermoplastic with conductive filler, is positioned between a substrate and the aligned rows. Heat treatment through the substrate melts the adhesive onto and between the rows, thus encapsulating the rows with the adhesive. The temperature gradient of the adhesive between the substrate and the alignment fixture, with the temperature at the alignment fixture being near ambient temperature, yields a viscosity gradient such that the adhesive does not stick to the surface of the alignment fixture. Upon removal of the alignment fixture, the encapsulated rows remain bonded to the substrate. The surfaces to be etched are thus exposed and planarized to within microns, while the active transducer devices are protected from handling damage and redeposition contamination during etching by the encapsulating adhesive. Following the patterning and reactive ion etching or ion milling of the air bearing slider structure, the photoresist is stripped and the rows remain bonded to the substrate, since the adhesive is resistant to the photoresist stripper. The rows are cut into individual sliders directly on the substrate, after which the adhesive is completely stripped upon exposure to a safe organic solvent.

BRIEF DESCRIPTION OF THE DRAWINGS

The invention will be described with reference to the drawings in which.

It should be noted that the Figures are not necessarily drawn to scale and that the proportions of the illustrated parts do not reflect actual dimensions which are used in the implementation of the invention.

DETAILED DESCRIPTION OF THE INVENTION

Figure 1:
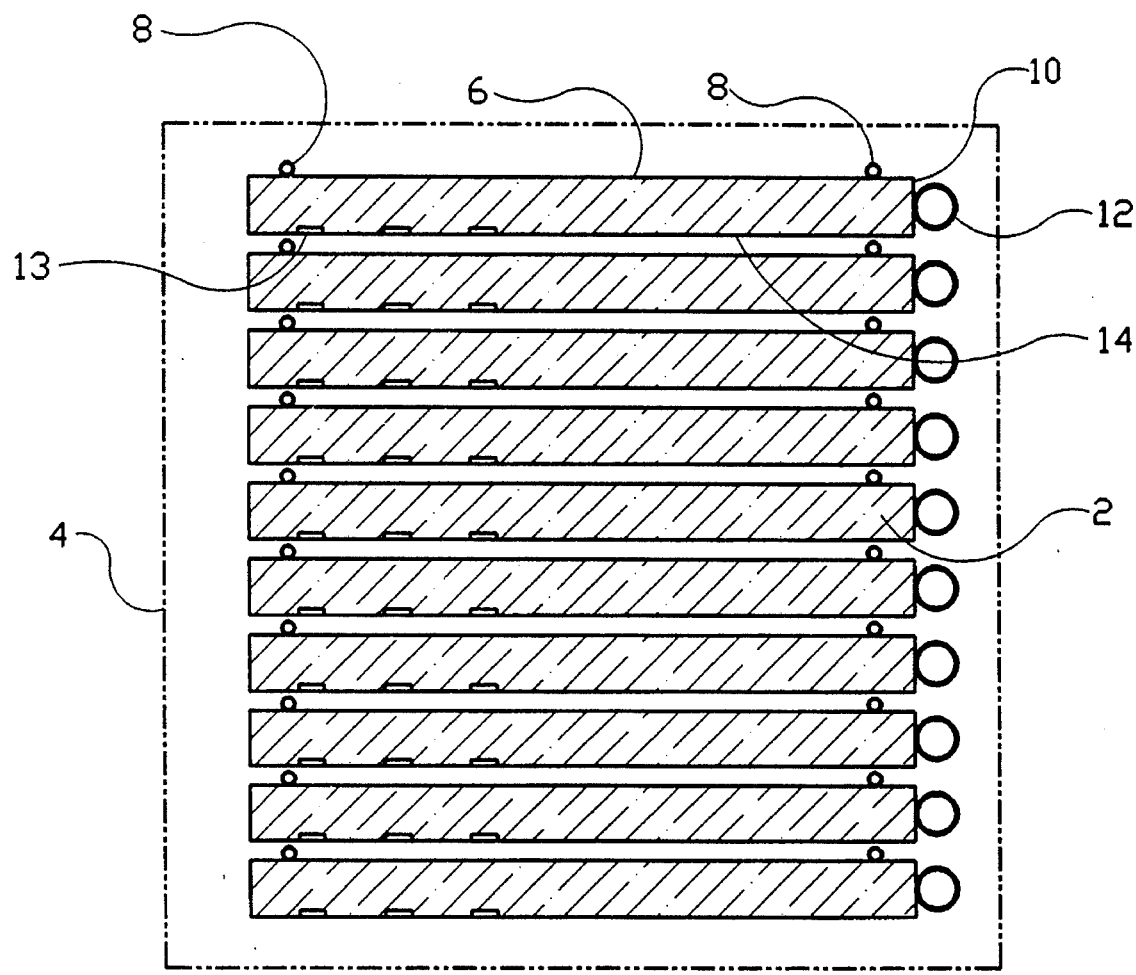
FIG. 1 is a top view plan of the alignment fixture showing the slider rows mechanically aligned against pins.

With reference to FIG. 1, air bearing slider rows 2 are placed onto alignment fixture 4. Edges 6 of the rows are positioned directly against y-alignment pins 8, and edges 10 of the rows are positioned directly against x-alignment pins 12. Active transducer elements 13 are located at edges 14 of the rows.

Figure 2:
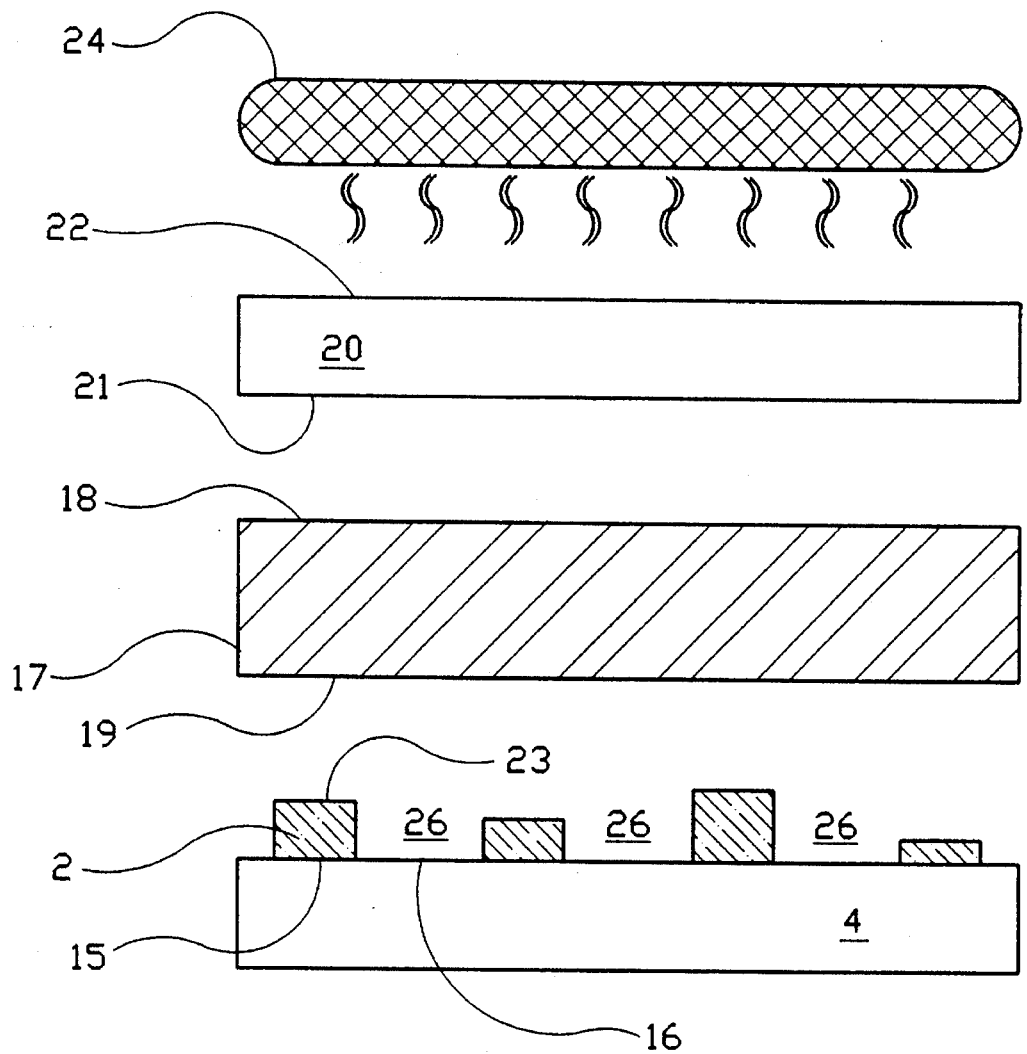
FIG. 2 is a side view of the slider rows, alignment fixture, and substrate, illustrating the process of bonding the aligned slider rows onto the substrate by heat treating the adhesive layer through the substrate.

FIG. 2 is a side view of the alignment fixture, slider rows, adhesive layer, and substrate, illustrating the process of bonding the rows to the etch substrate.. After the slider rows 2 are aligned in x- and y-directions onto alignment fixture 4, as described above, with surfaces 15 of the rows in direct contact with top planar surface 16 of the alignment fixture, a layer of thermally conductive adhesive 17, comprised of thermoplastic with a conductive filler, by way of example, is positioned with its top surface 18 in contact with surface 21 of substrate 20. In a specific embodiment of this invention, the layer of adhesive is pre-laminated onto the substrate. The bottom surface 19 of the adhesive layer is substantially in contact with top surfaces 23 of the rows, although it is noted that due to variations in thickness resulting from lack of dimensional control in cutting the rows, the top surfaces are generally not coplanar. A heat source 24 is proximal to surface 22 of the substrate. Heat transferred to the substrate from the heat source and conducted through the substrate causes the temperature at surface 21 of the substrate to increase to a temperature sufficiently high to melt the adhesive, which temperature may be in the range of 400–500 degrees Farenheit. The melted adhesive flows into and fills the spaces 26 between the rows, and flows down to surface 16 of the alignment fixture. The temperature at surface 16 is near ambient, due to a large temperature gradient through the thermally conductive adhesive layer. The resultant higher viscosity of the adhesive at surface 16, coupled with the non-stick surface of the alignment fixture, prevents the adhesive from adhering to the alignment fixture during the subsequent removal of the alignment fixture from the rows, adhesive, and substrate.

Figure 3:
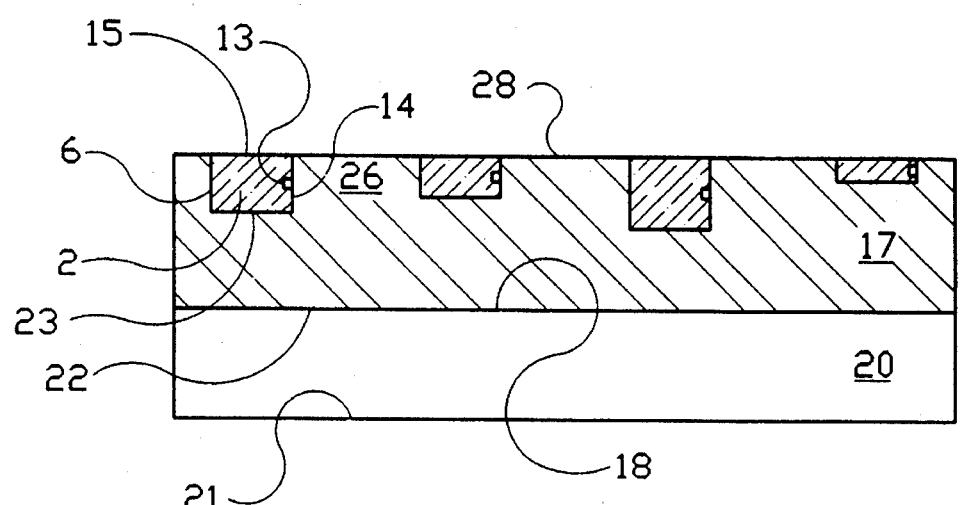
FIG. 3 is a side view of the slider rows and substrate subsequent to the bonding process, illustrating the encapsulation of the rows and the planarized surface.

FIG. 3 illustrates the configuration of the rows, adhesive, and substrate subsequent to removal of the alignment fixture. Adhesive 17 has substantially filled spaces 26 between rows 2, thereby encapsulating the rows and protecting the active devices 13 positioned on edges 14. Surface 28 of the adhesive is substantially coplanar with surfaces 15 of the rows, where the air bearing slider structure is to be formed.

Subsequent to the above described bonding process, conventional patterning techniques are used on surfaces 15 of the rows, and reactive ion etching or ion milling of the slider structures is performed. The planarity of the surface to be etched permits use of thin resist layers, yielding improved critical dimension (CD) control and resolution. Due to the encapsulation of the rows, active transducer devices 13 are physically and chemically protected during the etch. After completion of the etch, the photoresist is stripped, using a standard photoresist stripper, during which time the rows remain bonded to the substrate. The thermoplastic adhesive used is resistant to the photoresist stripper for more than one minute, which allows for complete stripping of the photoresist wothout compromising the bonding of the rows to the substrate. As a result, the subsequent cutting of the rows into individual sliders can be accomplished while the rows are still bonded to the substrate, and the active transducers are still physically protected by the encapsulating adhesive. Thus, there is no need for a partoff/rebonding operation. The individual sliders are removed from the cut portions of the substrate by stripping the adhesive with a safe organic solvent.

An advantage of the invention is the uniform etch depth of the aerodynamic slider structures, due to the vertical alignment of the surfaces to be etched. Thus there is greater process variation tolerance, while still maintaining the optimal characteristics of the air bearing sliders.

Other features of this invention is the decrease in handling damage, a significant decrease in chemical contamination, and reduced high-temperature degradation of the active transducer devices during the etching step. The result is a higher yield of effective operable air bearing sliders. Another advantage of the invention is the elimination of an entire processing step, i.e., the partoff/rebonding operation, and the resultant reduction of cycle time, with its concomitant savings in production costs.

What is claimed is:

1. A process for reactive ion etching of air bearing sliders comprises the steps of:

mechanically aligning a plurality of rows of unetched sliders on which magnetic transducers are deposited;

positioning a layer of thermally conductive adhesive between said rows and a substrate;

heating said adhesive through the substrate such that the adhesive bonds the rows to the substrate while encapsulating said rows of unetched sliders, so that the surfaces of said unetched sliders that are to be etched are planarized;

applying a patterned photoresist to said surfaces of said unetched sliders and reactive ion etching exposed portions of said slider surfaces;

stripping said photoresist and cutting said rows into individual sliders while said rows of sliders are still bonded to the substrate; and stripping said adhesive by exposure to an organic solvent;

wherein said step of mechanically aligning said rows of sliders comprises aligning said slider rows against pins onto an alignment fixture.

2. A process for ion milling of air bearing sliders comprises the steps of:

mechanically aligning a plurality of rows of unetched sliders on which magnetic transducers are deposited;

positioning a layer of thermally conductive adhesive between said rows and a substrate;

heating said adhesive through the substrate such that the adhesive bonds the rows to the substrate while encapsulating said rows of unetched sliders, so that the surfaces of said unetched sliders that are to be etched are planarized;

applying a patterned photoresist to said surfaces of said unetched sliders and ion milling exposed portions of said slider surfaces;

stripping said photoresist and cutting said rows into individual sliders while said rows of sliders are still bonded to the substrate; and stripping said adhesive by exposure to an organic solvent;

wherein said step of mechanically aligning said rows of sliders comprises aligning said slider rows against pins onto an alignment fixture.

3. A process as in claims 1 or 2, wherein said step of heating said adhesive comprises heating said substrate to a temperature in the range of 400–500 degrees Fahrenheit.

* * * * *